United States Patent

Cotton et al.

[15] 3,638,782
[45] Feb. 1, 1972

[54] TRACTOR MOUNTED GRAIN AUGER

[72] Inventors: Sidney S. Cotton, Box 386; Richard A. Cotton, P.O. Box 502, both of Glasgow, Mont. 59230

[22] Filed: June 29, 1970

[21] Appl. No.: 50,859

[52] U.S. Cl. ............................................. 198/233, 198/117
[51] Int. Cl. ........................................................ B65g 41/00
[58] Field of Search .............. 198/117, 118, 119, 120, 120.5, 198/88, 233, 139; 214/508, 83.26

[56] References Cited

UNITED STATES PATENTS

| 2,631,715 | 3/1953 | Vickers | 198/118 |
| 2,856,062 | 10/1958 | Kling | 198/120.5 |
| 3,134,480 | 5/1964 | Loosli | 198/117 |

Primary Examiner—Richard E. Aegerter
Attorney—Clarence A. O'Brien and Harvey B. Jacobson

[57] ABSTRACT

A mobile grain elevator including an elongated auger conveyor assembly disposed above and extending lengthwise of a mobile support having front and rear ends. The mobile support includes front and rear lift arm assemblies having free ends swingable through upright planes extending longitudinally of the mobile support and to which one pair of ends of a pair of support arm assemblies are pivotally secured for relative oscillation about horizontal transverse axes. Further, the other pair of ends of the support arm assemblies are pivotally attached to longitudinally spaced portions of the conveyor assembly and structure is provided to control relative oscillation between one of the lift arm assemblies and the corresponding support arm, whereby uncontrolled longitudinal shifting of the conveyor assembly relative to the lift arm assemblies is prevented. Also, the mobile support is provided with means for selectively swinging both the front and rear lift arm assemblies relative thereto whereby the front and rear ends of the auger conveyor assembly may be adjusted in elevation.

6 Claims, 6 Drawing Figures

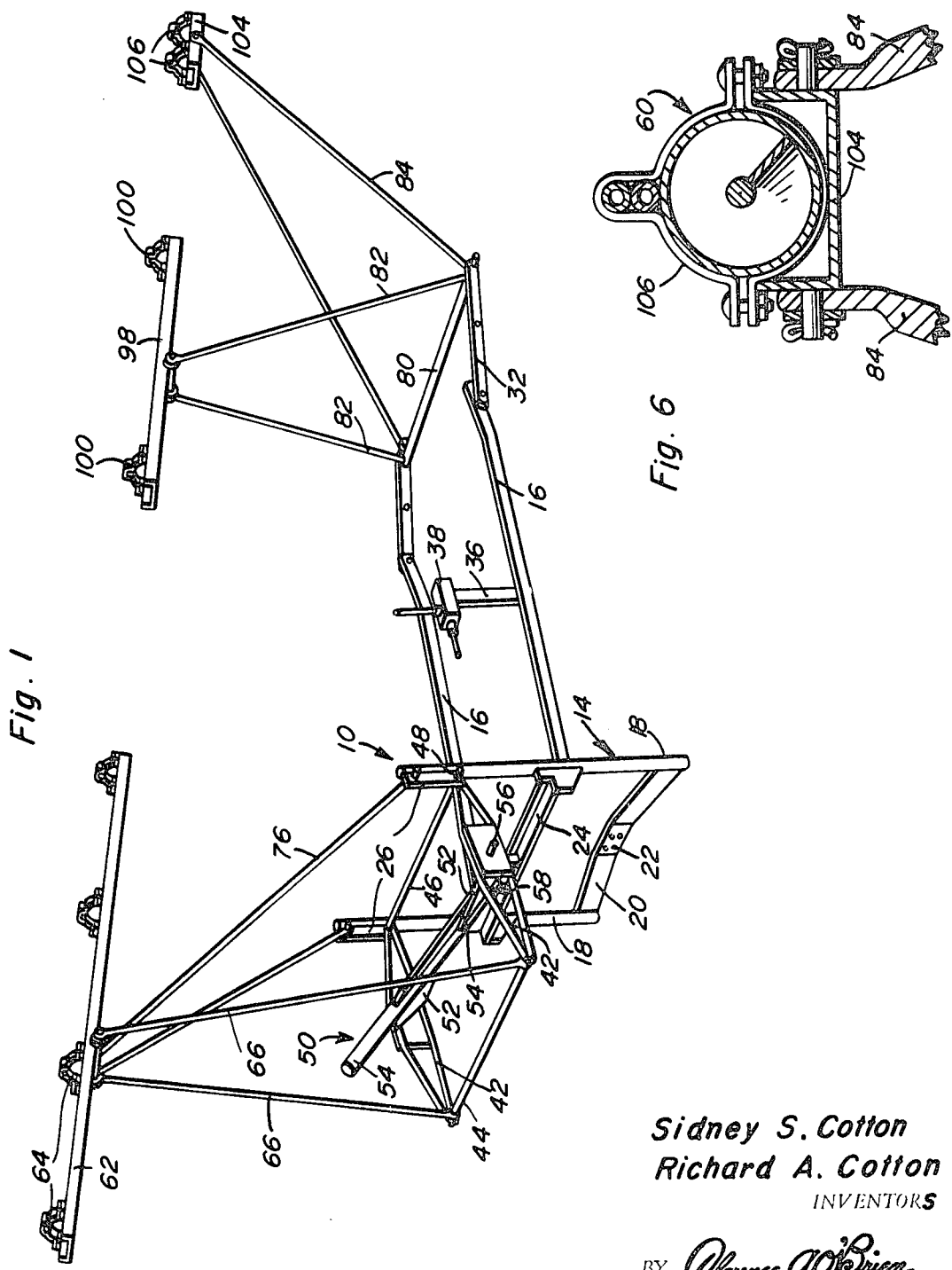

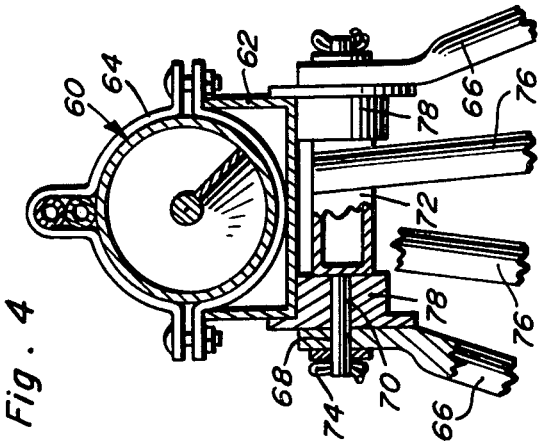
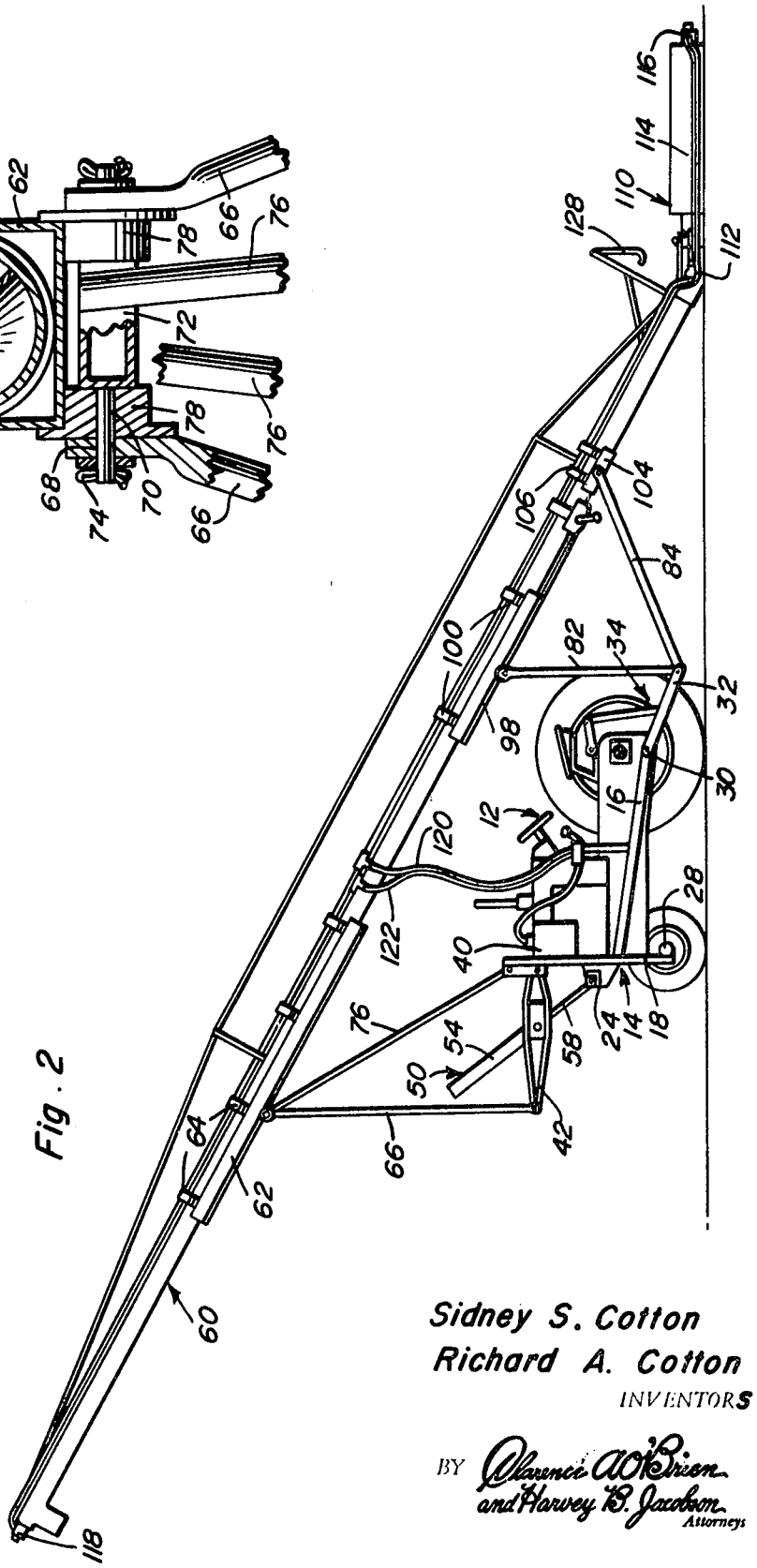

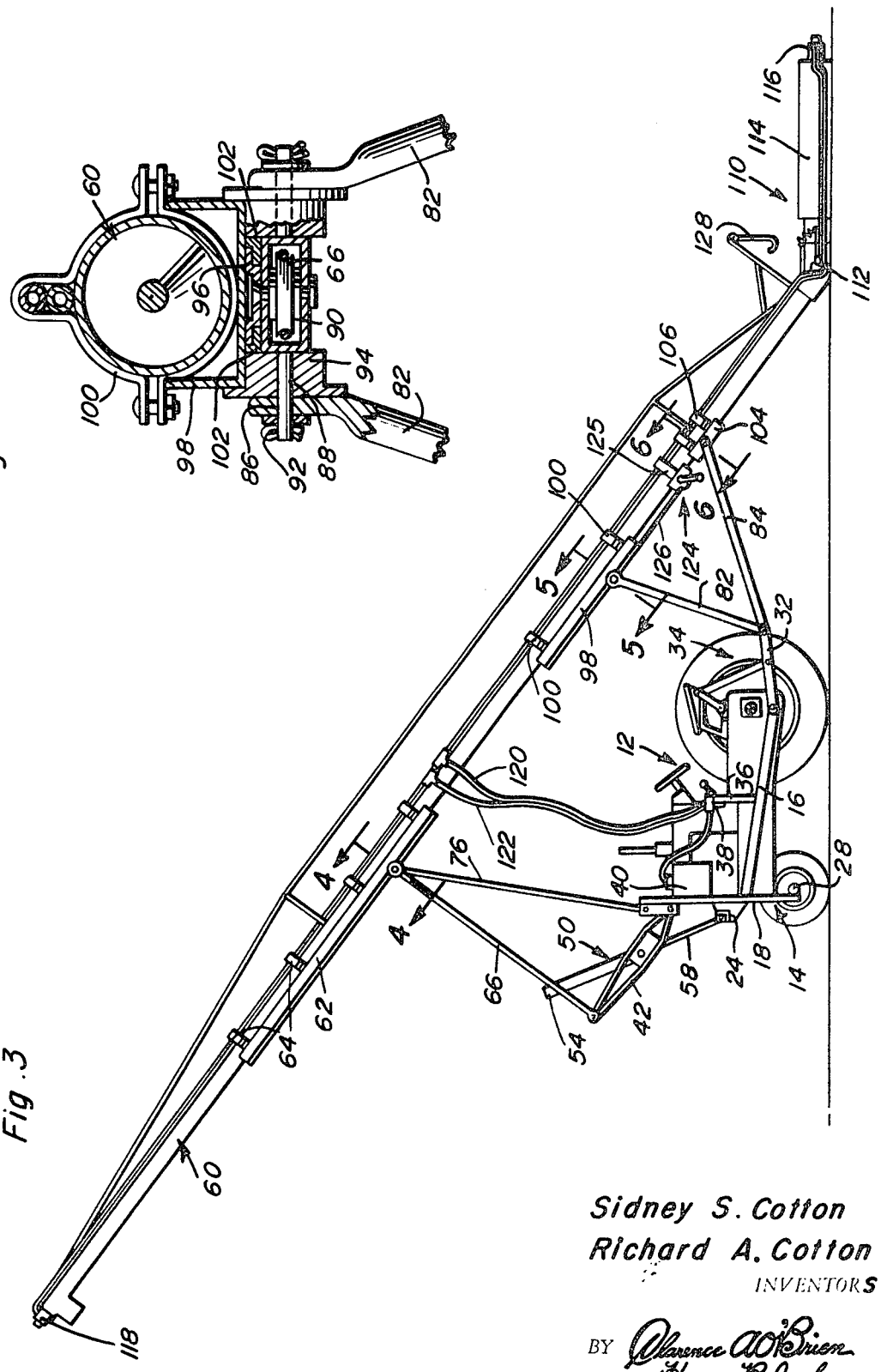

TRACTOR MOUNTED GRAIN AUGER

The tractor mounted grain auger of the instant invention has been designed to facilitate the handling or conveying of small grains by small grain farmers. The mobile grain auger can be readily transported from one location to another, properly positioned relative to the location of the grain to be conveyed and the desired discharge point of the conveyed grain and can be readily operated by a single workman.

The mobile grain auger has also been constructed in a manner whereby power transmitting belts, pulleys, and shafts as well as an auxiliary power unit are not needed and thus have been eliminated.

The auger assembly of the mobile grain auger is driven by one or more hydraulic motors and the mobile platform upon which the auger conveyor assembly is mounted comprises a conventional farm tractor equipped with a hydraulic pressure system. In addition, one set of lifting arms for the overhead auger conveyor comprise conventional implement lift arms at the rear of the tractor and which are therefore tractor-driven and the other lift arm assembly is actuated by a hydraulic cylinder which may also derive its source of power from the tractor hydraulic system.

The main object of this invention is to provide a highly mobile and efficient grain elevator attachment for a conventional farm tractor and which may be transported from one location to another and properly positioned as well as actuated by a single workman.

Still another object of this invention is to provide an attachment in accordance with the preceding objects which may be readily dismounted from the associated farm tractor thereby freeing the tractor for other farm uses during periods of nonuse of the train auger or elevator.

A still further object of this invention is to provide a grain elevator whose components for supporting the associated grain auger from a corresponding farm tractor are constructed in a manner whereby a conventional grain auger may be used with little modification thereto.

A final object of this invention to be specifically enumerated herein is to provide a mobile grain elevator in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the grain elevator attachment for support from a conventional form of farm tractor and with the grain auger assembly removed;

FIG. 2 is a side elevational view of the complete grain elevator assembly;

FIG. 3 is a side elevational view similar to FIG. 2 but with the auger conveyor portion of the elevator in a different inclined position;

FIG. 4 is a fragmentary transverse sectional view taken substantially upon the plane indicated by the section line 4—4 of FIG. 3;

FIG. 5 is a fragmentary enlarged transverse sectional view taken substantially upon the plane indicated by the section line 5—5 of FIG. 3; and FIG. 6 is an enlarged transverse sectional view taken substantially upon the plane indicated by the section line 6—6 of FIG. 3.

Referring now more specifically to the drawings, the numeral 10 generally designates the supporting structure assembly of the instant invention which is designed to be mounted upon a conventional farm tractor such as that generally designated by the reference numeral 12 and illustrated in FIGS. 2 and 3 of the drawings. The assembly 10 includes a forward upright frame referred to in general by the reference numeral 14 and a pair of opposite side longitudinal braces 16. The frame 14 consists of a pair of opposite side uprights 18 interconnected at their lower ends by means of a transverse brace 20 centrally apertured as at 22 and centrally intermediate their opposite ends by means of a central transverse brace 24. The upper ends of the uprights 18 include mounting brackets 26 and the forward ends of the longitudinal brace members 16 have their forward ends secured to the uprights 18.

The apertured central portion of the transverse brace 20 is secured to the central portion of the front axle assembly 28 of the tractor 12 by means of suitable fasteners (not shown) and the rear ends of the longitudinal brace members are anchored to the pivot points 30 for the lower arms 32 of the tractor three-point hitch referred to in general by the reference numeral 34. The left side longitudinal brace member 16 includes an upright standard 36 upon whose upper end a hydraulic fluid control valve assembly 38 is mounted and the left-hand upright 18 has a hydraulic fluid reservoir 40 supported therefrom in any convenient manner, see FIG. 2.

The lower arms 32 of the three-point hitch 34 define a rear lift arm assembly which is swingable through an upstanding plane extending longitudinally of the tractor 12 and a pair of transversely spaced lift arms 42 have corresponding ends thereof pivotally supported from the lower ends of the corresponding mounting brackets 26 and the other pair of corresponding ends thereof interconnected by means of a transverse brace 44. The ends of the arms 42 pivotally supported from the bracket members 26 are interconnected by means of a transverse brace 46 and the opposite ends of the transverse brace 46 are rotatably received through apertures 48 formed in the mounting bracket 26. The lift arms 42 comprise a forward lift arm assembly and a hydraulic ram assembly referred to in general by the reference numeral 50 has bracing gusset plates 52 secured to diametrically opposite portions of its cylinder portion 54 and the plates 52 include aligned sleeve portions 54 in whose remote ends stub pivot pins 56 carried by the arms 42 are rotatably received. In addition, the ram 50 includes a piston rod portion 58 whose free end is pivotally attached to the transverse brace 24 centrally intermediate its opposite ends. Accordingly, upon extension and retraction of the ram 50, the free forward ends of the arms 42 will be raised and lowered, respectively.

A main auger conveyor assembly is referred to in general by the reference numeral 60 and has an elongated upwardly opening channel member 62 secured to its discharge end portion by means of a plurality of clamp structures 64 spaced longitudinally of the auger conveyor assembly 60. The channel member 62 is disposed beneath the assembly 60 and embracingly receives the adjacent lower portions thereof. Further, a pair of support arms 66 have one pair of corresponding ends thereof pivotally secured to the free ends of the lift arms 42. The lower ends of the upstanding support arms 66 are journaled on the opposite ends of the transverse brace 44 and the upper ends of the support arms 66 are provided with registered apertures 68 through which stub pin portions 70 of a connecting block 72 are secured by means of fasteners 74. The upper ends of a pair of brace arms 76 are secured to the connecting block 72 and are therefore oscillatable relative to the arms 66. Further, the lower ends of the brace arms 76 are pivotally secured to the upper ends of the brace members 26.

The pins 70 have flanged wheels 78 journaled thereon intermediate the opposite ends of the connecting block 72 and the inside surfaces of the support arms 66 and the channel member 62 is rollingly and guidingly engaged with the flanged wheels 78.

A removable drawbar 80 is pivotally secured and extends between the rear ends of the lift arms 32 and has the lower ends of a pair of upstanding upwardly convergent lift arms 82 pivotally secured to its opposite end portions. Also, the forward ends of a pair of rearwardly and upwardly inclined brace arms 84 are pivotally secured to opposite end portions of the drawbar 80.

The convergent upper ends of the support arms 82 are provided with aligned apertures 86 through which the remote ends of a pair of pivot pins 88 projecting outwardly from opposite sides of a connecting yoke 90 are secured by means of fasteners 92. A pair of flanged rollers or wheels 94 are journaled on the pins 88 between the connecting yoke 90 and the confronting sides of the support arms 82 and the yoke 90 includes an elongated track 96 mutually perpendicular with the pivot pins 88 and the axis of rotation of the pulley 66 and the axes of rotation of the flanged wheels or rollers 94.

A channel member 98 which is similar to the channel member 62 is supported from the auger screw conveyor 60 by means of a pair of longitudinally spaced clamps 100 and the channel member 98 includes a pair of lower angle irons 102 defining followers slidingly and guidingly engaged with opposite side marginal portions of the track 96, the track 96 being held captive between the angle irons 102.

A third channel member 104 is pivotally supported between the upper rear ends of the arms or braces 84 and the third channel member 104 is clamped in position along the auger conveyor 60 by means of a pair of longitudinally spaced clamps 106. Accordingly, the channel member 104 is maintained in position relative to the auger conveyor 60 while the latter may be shifted longitudinally relative to the adjacent ends of the arms 82, 66 and 76.

An auger assembly referred to in general by the reference numeral 110 has its discharge end pivotally supported from the inlet end of the auger conveyor 60 as at 112 and the assembly 110 includes a main body tube 114 in which an auger screw (not shown) is journaled while a hydraulic motor 116 is carried by the end of the tube 114 remote from the auger conveyor 60 and drivingly coupled to the auger screw within the tube 114.

The upper or discharge end of the auger conveyor 60 is provided with a second hydraulic motor 118 for driving the screw member of the auger conveyor 60 and the hydraulic motors have their inlet and outlet ports connected by inlet and outlet hydraulic lines to which the discharge and inlet ends of supply and return lines 120 and 122 are communicated. The inlet end of the supply line and the outlet end of the return line are connected to the valve assembly 38 and accordingly, full operation of the motors 116 and 118 may be controlled by the operator of the tractor 12. Finally, a winch assembly referred to in general by the reference numeral 124 is clampingly supported from the auger conveyor 60 by means of a clamp assembly 125 and a pull cable 126 is provided and has one end thereof anchored relative to the auger conveyor 60 while the other end thereof is passed about the pulley wheel 66 and secured to the winding member (not shown) of the winch assembly 124. Accordingly, the auger conveyor 60 may be shifted longitudinally relative to the upper ends of the arms 66, 76 and 82 independent of operation of the three-point hitch 34 or the hydraulic cylinder 50.

In operation, if it is desired to elevate the upper discharge end of the conveyor 60, the hydraulic cylinder 50 is extended and if it is desired to raise the lower end of the auger screw conveyor 60, the three-point hitch 34 is actuated. Further, the winch assembly may be actuated to cause longitudinal shifting of the auger screw conveyor 60 independent of actuation of the cylinder 50 and the three-point hitch 34 and a pivoted hook 128 is provided on the lower inlet end of the auger screw conveyor 60 and engageable with the auger screw assembly 110 for retaining the inlet end thereof in a raised position.

The foregoing is considered as illustrative only of the principles of the invention. Further, since numerous modifications and changes will readily occur to those skilled in the art, it is desired not to limit the invention to the exact construction and operation shown and described, and accordingly all suitable modifications and equivalents may be resorted to, falling within the scope of the invention as claimed.

We claim:

1. A grain elevator including an elongated conveyor assembly, a mobile support having front and rear ends, front and rear support means carried by said mobile support, said support means being operably connected to longitudinally spaced portions of said conveyor assembly and supporting said conveyor assembly in elevated position above said mobile support for independent vertical adjustment of the opposite end portions of said conveyor relative to the surface upon which said mobile support is disposed, whereby both the elevation and angular displacement of the conveyor assembly about a horizontal axis extending transversely of the mobile support may be adjusted as desired, said front and rear support means and said conveyor assembly including coacting means supporting said conveyor assembly from said front and rear support means for limited longitudinal shifting relative to said front and rear support means, and means operably connected between said support means and said conveyor assembly for adjustably longitudinally shifting said assembly relative to said support means.

2. The combination of claim 1 wherein one end of said conveyor assembly comprises its inlet end and is provided with an elongated feed conveyor having inlet and outlet ends, the outlet end of said feed conveyor being pivotally supported from the inlet end of the conveyor assembly for adjustable oscillation about a horizontal transverse axis.

3. A grain elevator including an elongated conveyor assembly, a mobile support having front and rear ends, front and rear support means carried by said mobile support, said support means being operably connected to longitudinally spaced portions of said conveyor assembly and supporting said conveyor assembly in elevated position above said mobile support for independent vertical adjustment of the opposite end portions of said conveyor relative to the surface upon which said mobile support is disposed, whereby both the elevation and angular displacement of the conveyor assembly about a horizontal axis extending transversely of the mobile support may be adjusted as desired, said front and rear support means including upstanding front and rear support arm structures having their lower ends pivotally secured to the front and rear ends of said mobile support for oscillation about horizontal transverse axes, said longitudinally spaced portions of said conveyor assembly including front and rear attaching means to which the upper ends of said support arm structures are pivotally attached, at least one of said attaching means and the corresponding support arm structure including coacting means for shifting the associated pivot axis longitudinally of said conveyor assembly, said mobile support comprising a farm tractor including a lift arm means actuated implement hitch on the rear end thereof, the lower end of said rear support arm structure being pivotally attached to the lift arm means of said implement hitch.

4. A grain elevator including an elongated conveyor assembly, a mobile support having front and rear ends, front and rear support means carried by said mobile support, said support means being operably connected to longitudinally spaced portions of said conveyor assembly and supporting said conveyor assembly in elevated position above said mobile support for independent vertical adjustment of the opposite end portions of said conveyor relative to the surface upon which said mobile support is disposed, whereby both the elevation and annular displacement of the conveyor assembly about a horizontal axis extending transversely of the mobile support may be adjusted as desired, said front and rear support means including upstanding front and rear support arm structures having their lower ends pivotally secured to the front and rear ends of said mobile support for oscillation about horizontal transverse axes, said longitudinally spaced portions of said conveyor assembly including front and rear attaching means to which the upper ends of said support arm structures are pivotally attached, at least one of said attaching means and the corresponding support arm structure including coacting means for shifting the associated pivot axis longitudinally of said conveyor assembly, said front support arm structure comprising a pair of downwardly divergent arm members pivotally secured together at their upper ends, said corresponding support arm structure comprising said front arm structure, a lift arm member pivotally attached at one end to said mobile support for swinging about a horizontal transverse axis, the other end of said lift arm member and the lower end of one of said divergent arm members being pivotally secured together for relative oscillation about a horizontal transverse axis, and motor means operatively connected between said mobile support and said lift arm member for swinging the latter relative to said mobile support.

5. The combination of claim 4 wherein said mobile support comprises a farm tractor including a lift arm means actuated implement hitch on the rear end thereof, the lower end of said rear support arm structure being pivotally attached to the lift arm means of said implement hitch.

6. The combination of claim 5 wherein said front and rear support means and said conveyor assembly include coacting means supporting said conveyor assembly from said front and rear support means for limited longitudinal shifting relative to said front and rear support means, and means operably connected between said support means and said conveyor assembly for adjustably longitudinally shifting said assembly relative to said support means.

* * * * *